March 17, 1970     D. R. EDWARDS     3,501,581
ELECTRIC CONDUCTORS AND ELECTRIC POWER
CABLES INCORPORATING THEM
Filed May 21, 1968
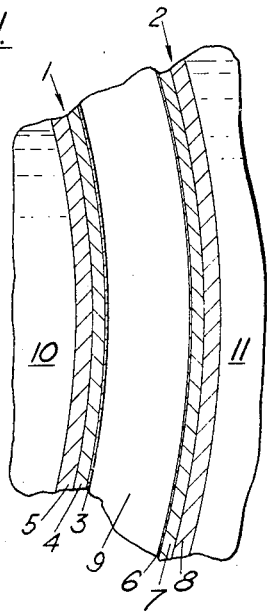
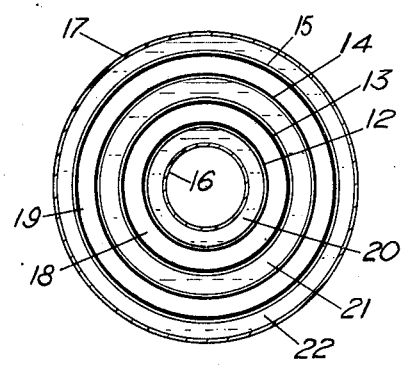 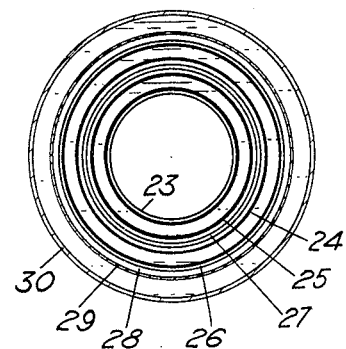
*Inventor*
DEREK REGINALD EDWARDS
By Webb, Burden
Robinson & Webb
*Attorneys*

United States Patent Office 3,501,581
Patented Mar. 17, 1970

3,501,581
ELECTRIC CONDUCTORS AND ELECTRIC POWER CABLES INCORPORATING THEM

Derek R. Edwards, Windsor, England, assignor to British Insulated Callender's Cables Limited, London, England Filed May 21, 1968, Ser. No. 730,842
Claims priority, application Great Britain, May 23, 1967, 23,897/67
Int. Cl. H01b *7/34*
U.S. Cl. 174—15 19 Claims

ABSTRACT OF THE DISCLOSURE

A superconductor for transmitting high power at high voltage, especially for cables and busbars, is a composite bonded structure comprising a superconductive layer, a metal layer e.g. copper or aluminium having high conductivity when in the non-superconducting state, and a layer of an alloy having high mechanical strength and small thermal expansion coefficient, for example 36% nickel-steel. Coaxial power cables may incorporate at least two of the conductors in tubular form arranged with their superconducting surfaces facing each other and the annular space between them evacuated or filled with liquid helium or super-critical helium gas.

This invention relates to electric conductors for the transmission of very large amounts of power and especially to conductors for high voltage cables and high voltage cables incorporating the conductors. The term "cable" is used herein to include both single and multiconductor cables and insulated busbars forming part of a busbar system for high voltage, high power, alternating or direct current transmission. The invention also relates to installations of high voltage, high power cables.

The amount of power to be transmitted in a single high voltage, high power cable circuit, that is by a single three-conductor cable or three single-core cables, constituting an A.C. circuit, or by a two-conductor cable or two single-core cables constituting a D.C. circuit, is upwards of 1,000 megawatts and may be over 2,000 megawatts. Even at transmission voltages of 400 kv. A.C. or 500 kv. D.C., the cable losses in such circuits embodying cables of conventional design may be about 200 kw. per cable per mile in the case of single core A.C. cables operating at a conductor temperature of 85° C. and about 80% of that value in the case of each cable of an equivalent D.C. circuit. In the case of an A.C. cable, almost 80% of this loss is the $I^2R$ loss generated in the conductor. In a D.C. cable the proportion is even higher. The generation of so much heat in such a cable presents difficulties owing to the exceptionally thick wall of dielectric which makes it essential to provide some form of forced cooling of each cable conductor and to install heat exchangers for the abstraction of heat from the conductor coolant. Thus apart from the initial high cost of such a cable due to a not inconsiderable extent to the presence of a heavy tonnage/mile of cable of a high cost commodity, namely copper and/or aluminium, the installation is costly also because of the ancillary plant associated with the cable. The $I^2R$ loss of itself constitutes a serious expense that is continuous throughout the life of the cable—for such cables are generally used as vital feeders designed and intended to operate under full load conditions at all times.

It is known that many metals at temperatures approaching absolute zero (0° Kelvin) undergo a change of state as regards their ability to conduct electrons, which is characterised by a disappearance of resistance to flow of a uni-directional current. This state of being able to conduct electrons without resistance, termed the superconductive state, is destroyed by raising the temperature of the metal above a certain value termed the "critical temperature." To date practical applications have been limited to metallic bodies which are superconductive above 4.2° K., the normal boiling point of liquid helium. When the flow of current through a superconductive material reaches a certain value the magnetic field which it generates reaches a critical value above which loss of superconductiivty occurs. The critical value of this field depends upon the particular metallic material and its temperature. Examples of materials which become superconductive at temperature within a few degrees of absolute zero are aluminium, tin, lead, niobium and tantalum; niobium and certain alloys thereof are especially suitable for use in accordance with the invention.

It has been proposed to take advantage of the phenomenon of superconductivity of metals to design high voltage, high power cables which would have advantages over existing forms of force-cooled high voltage, high power cables as regards compactness of design and transmission losses. Metal which exhibit this phenomenon will hereinafter be referred to as superconductors.

The present invention is based on the discovery of an improved conductor especially suitable for use in such cables and in accordance with the invention the conductor comprises a composite bonded structure, of which the first layer is of a superconductor or superconductors, the second layer is of a metal or metals which are highly conductive when in a nonsuperconductive state, and the third layer is of an alloy having both a very small thermal expansion coefficient and a high mechanical strength such that the third layer has a high mechanical strength relative to each of the first and second layers.

The thickness of the first layer will normally be a small proportion of the thickness of the second and third layers.

The first layer, which is preferably a surface layer, must be of a superconductor or superconductors of sufficient thickness to permit the rated current of the cable to flow in the layer when in a superconductive state with a low resultant dissipation in the layer, preferably not exceeding 10 microwatt/cm.$^2$ of conductor surface. Niobium of a thickness of 0.0025 cm. is suitable.

The function of the second layer is to safeguard the cable under transient current overload conditions, when the superconductor is driven into the normal state and ceases to be able to carry the current, and the layer must be of sufficient thickness to perform this function and must be in good contact with the first layer. For example when the high conductivity metal is annealed aluminium of 99.999% purity having an electrical conductivity at 4.2° K. of at least $7\times10^8$ (ohm-cm.)$^{-1}$, or copper of a purity such that its conductivity is the same as that of 99.999% aluminium, a suitable thickness is between 0.05 and 0.1 cm.

The third layer has two functions namely to provide adequate mechanical strength to enable the conductor to be handled without damage and, when in tubular form, to withstand a pressure differential of several atmospheres, and to minimise the thermal contraction of the conductor on cooling to liquid helium temperatures, so that the necessity to resort to corrugation or the incorporation of bellows joints or other means of accommodating the change of length resulting from temperature change may be avoided or minimised. The alloy or each alloy of which this layer is made preferably exhibits an overall contraction, on cooling from ambient temperature to the temperature at which the first layer becomes superconductive, which is a small as possible and is preferably less than the strain at its yield point of the alloy. In general, this will entail using an alloy or alloys having a coefficient of thermal expansion of less than $3 \times 10^{-6}$ and preferably $2 \times 10^{-6}$ cm./deg. K.

A preferred example of the third layer, suitable for use with the niobium and aluminium first and second layers specifically referred to above, is a layer of 36% nickel-steel alloy of thickness 0.12 cm., such an alloy being sold under the trade names Invar and Nilo as Invar 36 and Nilo 36.

The composite conductor can be built-up as part of a composite structure incorporating another layer or other layers of conducting and/or insulating material.

The cable in accordance with the invention may be of any suitable form provided that it includes at least one composite conductor as specified above and means for maintaining the first layer in its superconductive state.

Preferred forms of cable comprise two or more co-axial conductors arranged with their first layers facing each other. Coaxiality may be maintained by spacers located helically or at frequent intervals along the length of the cable. Both conductors may be tubes of a niobium/copper/Invar or lead/copper/Invar or niobium/aluminium/Invar or lead/aluminium/Invar laminate, the niobium or lead layer being on the outside of the inner conductor and on the inside of the outer conductor. Superconductivity temperatures of the superconductive metal components of the composite conductors are obtained by maintaining a flow of liquefied helium or super-critical gaseous helium through the annular passage between the conductors, or within the inner conductor and around the outer conductor. In the latter case, the space between the inner and outer conductors is maintained under high vacuum.

A example of the construction of composite conductors in accordance with the invention suitable for use in cables in accordance with the invention and two examples of such cables will hereinafter be described by way of example with reference to the accompanying diagrammatic drawing in which:

FIGURE 1 shows part of two concentric conductors arranged with an annular space between them, FIGURE 2 is a cross-section of one form of cables, and FIGURE 3 is a cross-section of another form of cable.

Referring to FIGURE 1, conductor 1 consists of a first (or surface) layer 3 of niobium of thickness 0.0025 cm.; an intermediate layer 4 of annealed aluminium of 99.999% purity, thickness 0.1 cm.; and a third (or backing) layer 5 of a 36% nickel-steel alloy of thickness 0.12 cm., the alloy being one that is sold under the trade names Invar and Nilo as Invar 36 and Nilo 36. The conductor 2 is formed from identical layers 6, 7, 8 corresponding to the layers 3, 4, 5 respectively of conductor 1.

The annular space 9 between the conductors is evacuated and the annular spaces 10 and 11 immediately adjacent ot backing layers 5 and 8 are filled with liquid helium or super-critical gaseous helium at a temperature below that at which the surface layers 3 and 6 of the two conductors 1 and 2 are maintained in their superconductive state.

Alternatively the space 9 may contain liquid or super-critical gaseous helium, when the spaces 10 and 11 will be evacuated.

FIGURE 2 represents a three phase cable having four concentric conductors 12, 13, 14 and 15, the inner conductor 12 carrying current of one phase, the two intermediate conductors 13 and 14 both carrying current of the second phase, and the outer conductor 15 carrying current of the third phase. The conductors are identical with the conductors 1 and 2 shown in FIGURE 1, the thicker line in FIGURE 2 representing the superconductor layer 3 or 6 and the thinner line representing the outer boundary of the backing layer 5 or 8.

The cable also incorporates inner and outer concentric metallic tubes 16 and 17 which do not form part of the load carrying conductors of the cable. The tube 16, the annular space 18 between conductors 12 and 13, and the annular space 19 between the conductors 14 and 15 are all evacuated and the annular space 20 between the tube 16 and the inner conductor 12, the annular space 21 between the two intermediate conductors 13 and 14, and the annular space 22 between the outer conductor 15 and the outer tube 17 are all filled with liquid helium or super-critical gaseous helium.

Further layers of insulating material and/or evacuated spaces (not shown) are provided around the outer tube 17 as necessary to maintain the helium at the desired temperature.

Referring to FIGURE 3 this is also a three phase cable having four concentric load carrying conductors, an inner tubular conductor 23, two intermediate conductors 24 and 25 and an outer conductor 26. As in the cable shown in FIGURE 2, the conductors are composite conductors of the kind shown in FIGURE 1 and are represented by a thick line indicating the position of the superconductor and a thin line indicating the outer boundary of the backing layer. In this cable the interior of the inner tubular conductor 23 is evacuated, the annular space 27 between the two intermediate conductors 24 and 25 is evacuated, and an annular space 28 between the outer conductor 26 and a metal tube 29 is evacuated. The annular space between the inner conductor 23 and the inner intermediate conductor 25, the annular space between the outer intermediate conductor 24 and the outer conductor 28, and the annular space between the tube 29 and an outer metal tube 30 are filled with liquid helium or super-critical gaseous helium. Further layers of insulation and/or further annular evacuated spaces may be provided as necessary to maintain the helium at the required temperature.

In both cables described by way of example, mechanical spacers (not shown) between the various concentric tubes forming the cable provide both electrical and thermal insulation, except where adjacent layers are intended to be at the same electrical potential when the primary function is to provide thermal insulation. In the cable described, with reference to FIGURE 3 the cooling fluid itself also functions as an electrical insulating medium.

The sheath forming the external boundary of the outermost annulus of the cables described will be protected against mechanical damage by enclosing it in an outer casing from which it is preferably insulated by suitable thermal insulation and/or by evacuating the clearance between it and the casing.

What I claim as my invention is:

1. An electric conductor for the transmission of very large amounts of power at high voltages when a layer thereof is in the superconductive state comprising a composite bonded structure of which the first layer is of at least one superconductor, the second layer is of metal highly conductive when in a non-superconductive state, and the third layer is of an alloy having a high mechanical strength relative to each of the first and second layers and a very small thermal expansion coefficient.

2. A conductor as claimed in claim 1, in which the third layer is of an alloy having both a thermal expansion coefficient of less than $2 \times 10^{-6}$ cm./deg. K. and a mechanical strength such that on cooling from ambient temperature to the temperature at which the first layer becomes superconductive its overall contraction is less than the strain at its yield point.

3. A conductor as claimed in claim 1, in which the third layer is of an alloy of nickel and steel having a thermal expansion coefficient of less than $2 \times 10^{-6}$ cm./deg. K.

4. A conductor as claimed in claim 1 in which the third layer is of an alloy of nickel and steel containing about 36% of nickel.

5. A conductor as claimed in claim 1 in which the second layer is of annealed aluminium of 99.999% purity.

6. A conductor as claimed in claim 1 in which the second layer is annealed copper of a purity such that its electrical conductivity is equal to that of aluminium of 99.999% purity.

7. An electric cable for the transmission of very large amounts of power at high voltages comprising:
(a) at least one conductor in the form of a composite bonded structure, of which the first layer is of at least one superconductor, the second layer is of metal highly conductive when in a non-superconductive state, and the third layer is of an alloy having a high mechanical strength relative to each of the first and second layers and a very small thermal expansion coefficient, and
(b) means for maintaining the first layer in the superconductive state.

8. A cable as claimed in claim 7 in which the third layer of said conductor is of an alloy having a thermal expansion coefficient of less than $2 \times 10^{-6}$ cm./deg. K. and a mechanical strength such that on cooling from ambient temperature to the temperature at which the first layer becomes superconductive its overall contraction is less than the strain at its yield point.

9. A cable as claimed in claim 7 in which the third layer of said conductor is of an alloy of nickel and steel containing about 36% of nickel.

10. A cable as claimed in claim 6 in which the second layer of said conductor is of annealed aluminium of 99.999% purity.

11. A cable as claimed in claim 6 in which the second layer of said conductor is of a purity such that its electrical conductivity equals that of aluminuim of 99.999% purity.

12. An electric cable for the transmission of very large amounts of power at high voltages comprising:
(a) at least two conductors, each in the form of a composite bonded structure of which the first layer is of at least one superconductor, the second layer is of metal highly conductive when in a non-superconductive state, and the third layer is of an alloy having a high mechanical strength relative to each of the first and second layers, and a very small thermal expansion coefficient, the conductors being arranged coaxially with their first layers facing each other, and
(b) means for maintaining the first layer in the superconductive state.

13. A cable as claimed in claim 12, in which the annular space between the two conductors is evacuated.

14. A cable as claimed in claim 12 in which the annular space between the two conductors is filled with liquid helium.

15. A cable as claimed in claim 12 in which the annular space between the two conductors is filled with supercritical gaseous helium, 16. A cable as claimed in claim 12 in which the third layer of said conductor is of an alloy of nickel and steel containing about 36% of nickel.

17. A cable as claimed in claim 12 in which the second layer of said conductor is of annealed aluminium of 99.999% purity.

18. A cable as claimed in claim 12 in which the second layer of said conductor is of a purity such that its electrical conductivity equals that of aluminium of 99.999% purity.

19. A cable as claimed in claim 12 in which the third layer of said conductor is of an alloy having a thermal expansion coefficient of less than $2 \times 10^{-6}$ cm./deg. K and a mechanical strength such that on cooling from ambient temperature to the temperature at which the first layer becomes superconductive its overall contraction is less than the strain at its yield point.

References Cited

UNITED STATES PATENTS

| 3,331,041 | 7/1967 | Bogner | 335—216 |
| 3,372,470 | 3/1968 | Bindari | 29—599 |
| 3,428,925 | 2/1969 | Bogner | 335—216 |
| 3,432,783 | 3/1969 | Britton et al. | 335—216 |

LEWIS H. MYERS, Primary Examiner

A. T. GRIMLEY, Assistant Examiner

U.S. Cl. X.R.

29—194, 196.1, 197; 174—126; 333—99; 335—216